(12) United States Patent
Nevarez Pedroza

(10) Patent No.: US 10,896,402 B2
(45) Date of Patent: Jan. 19, 2021

(54) SHORT-RANGE WIRELESS DETERMINATION OF A VEHICLE'S ASSET INVENTORY

(71) Applicant: Verizon Patent and Licensing Inc., Arlington, VA (US)

(72) Inventor: Aaron Olaff Nevarez Pedroza, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

(21) Appl. No.: 14/868,918

(22) Filed: Sep. 29, 2015

(65) Prior Publication Data

US 2017/0091496 A1    Mar. 30, 2017

(51) Int. Cl.
*G06Q 10/08*    (2012.01)

(52) U.S. Cl.
CPC ....... *G06Q 10/087* (2013.01); *G06Q 10/0833* (2013.01)

(58) Field of Classification Search
CPC ...... G06Q 10/08; G06Q 10/087; G06Q 10/06; G06Q 10/0833; G06Q 50/30; G06C 50/30; G06K 2017/0045; G06K 19/0723; G06K 2017/0051; G07C 2009/0092; G07C 5/085
See application file for complete search history.

(56) References Cited

U.S. PATENT DOCUMENTS

| | | | | |
|---|---|---|---|---|
| 6,124,810 A | * | 9/2000 | Segal | G08G 1/20 340/441 |
| 6,448,886 B2 | * | 9/2002 | Garber | G06K 7/0008 235/385 |
| 2002/0123917 A1 | * | 9/2002 | Wolfe | G06Q 10/08 340/5.9 |
| 2004/0133303 A1 | * | 7/2004 | Sacks | G06Q 10/08 700/213 |
| 2006/0202809 A1 | * | 9/2006 | Lane | G06Q 10/08 340/438 |
| 2009/0026263 A1 | * | 1/2009 | Schmid | G06K 17/00 235/385 |
| 2010/0148931 A1 | * | 6/2010 | Pappu | G06K 7/0008 340/10.2 |
| 2013/0304348 A1 | * | 11/2013 | Davidson | G06Q 10/083 701/99 |
| 2015/0046298 A1 | * | 2/2015 | Zwakhals | G06Q 10/087 705/28 |
| 2016/0180274 A1 | * | 6/2016 | Zwakhals | G06Q 10/06315 705/7.25 |
| 2016/0283896 A1 | * | 9/2016 | Dziurda | G06Q 10/087 |

* cited by examiner

*Primary Examiner* — Christopher Stanford

(57) ABSTRACT

A device associated with a vehicle detects a first trigger indicating that the vehicle is moving for more than a first threshold time period, and identifies first assets proximate to the vehicle, based on the first trigger and using short-range wireless communications. The device detects a second trigger indicating that the vehicle has stopped moving for more than a second threshold time period and has started moving after stopping, and identifies second assets proximate to the vehicle, based on the second trigger and using short-range wireless communications. The device compares the identified first assets and the identified second assets, and generates a notification based on a result of the comparing the identified first assets and the identified second assets.

20 Claims, 16 Drawing Sheets

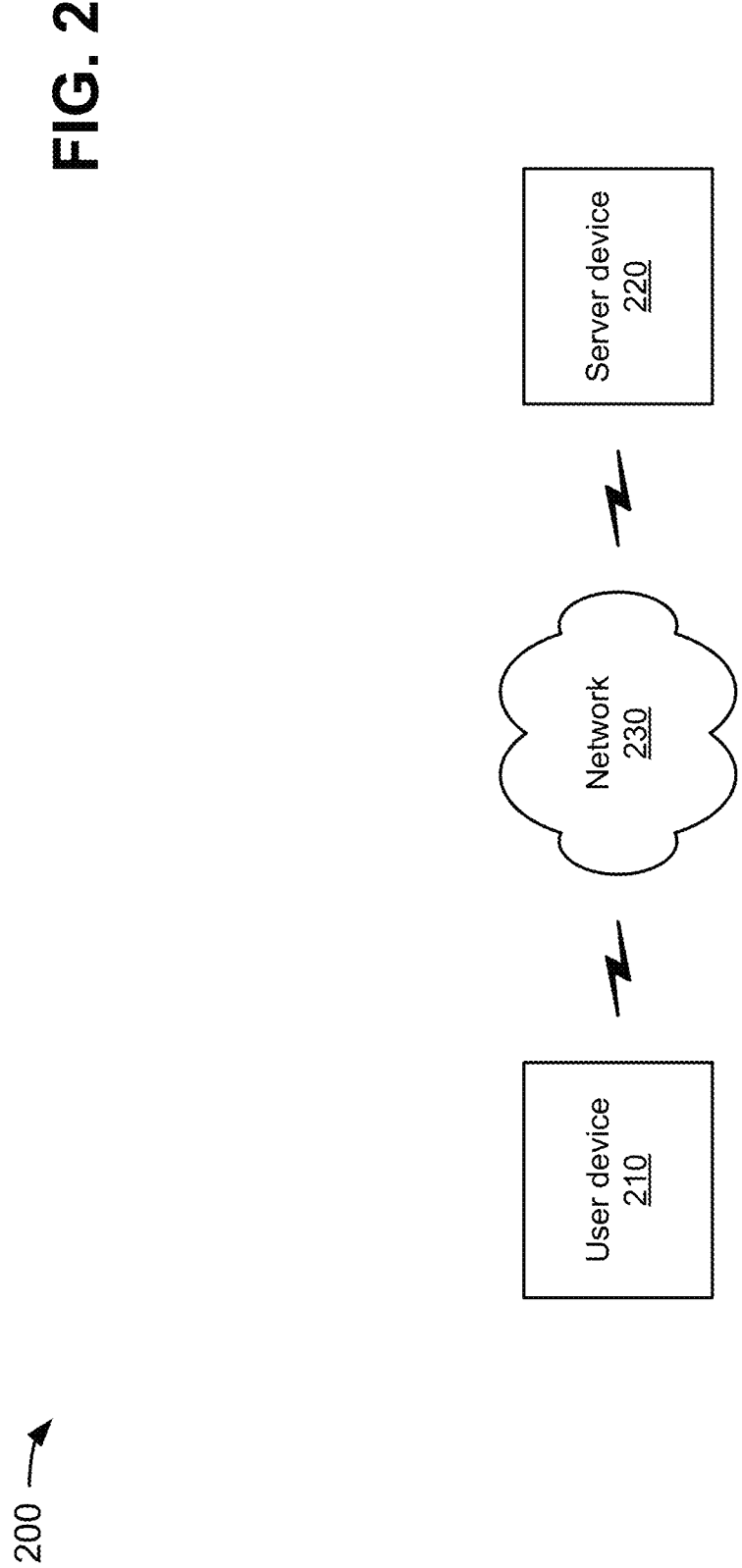

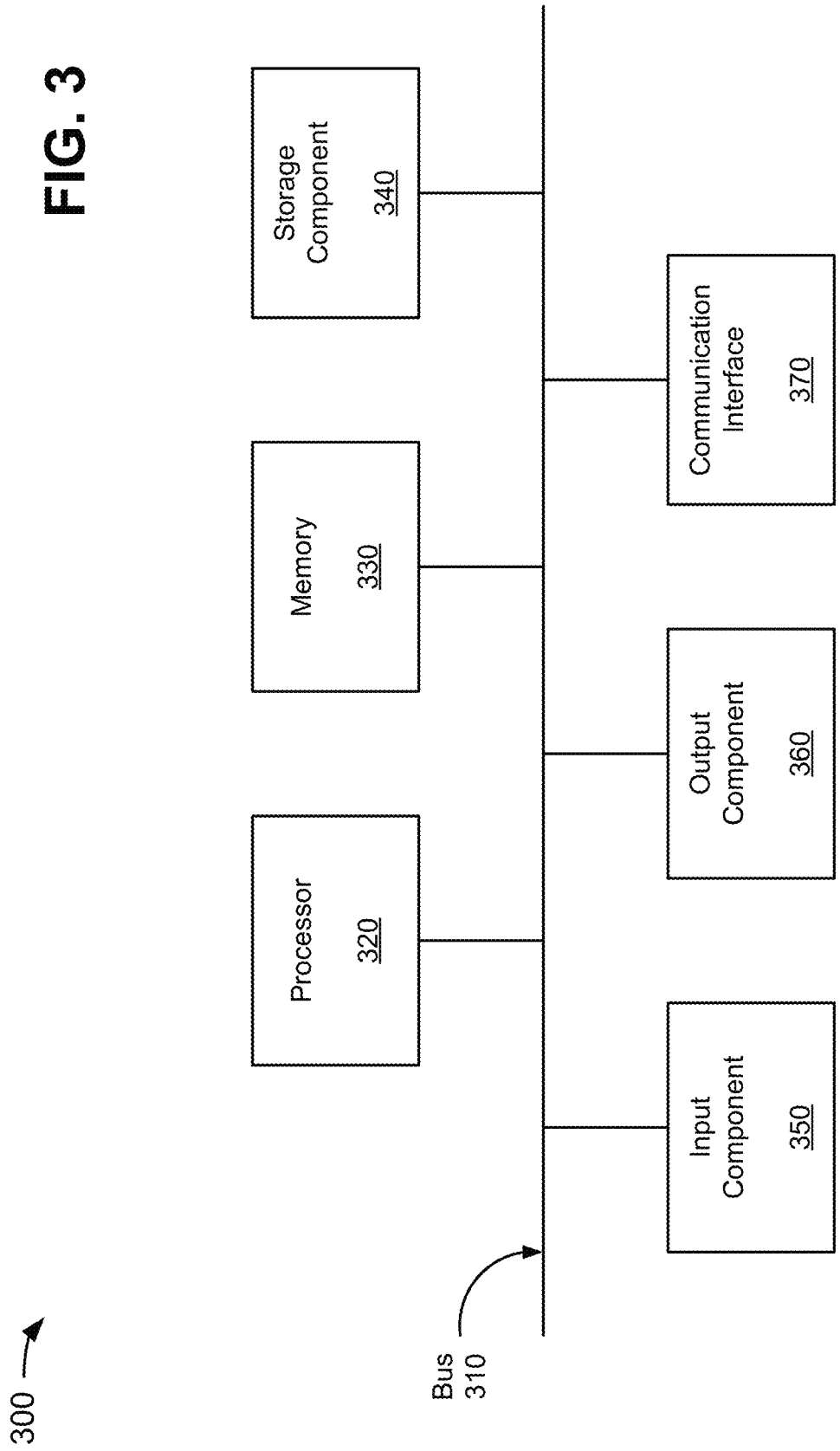

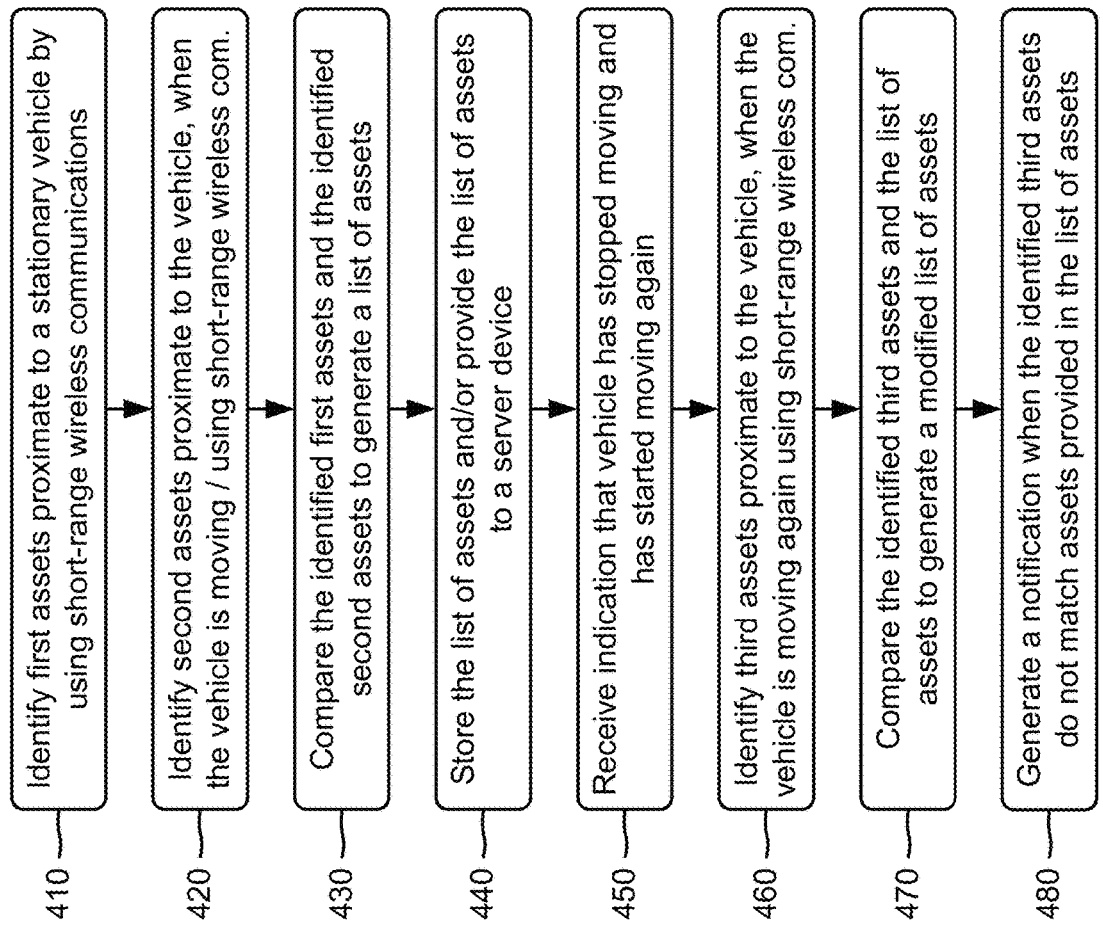

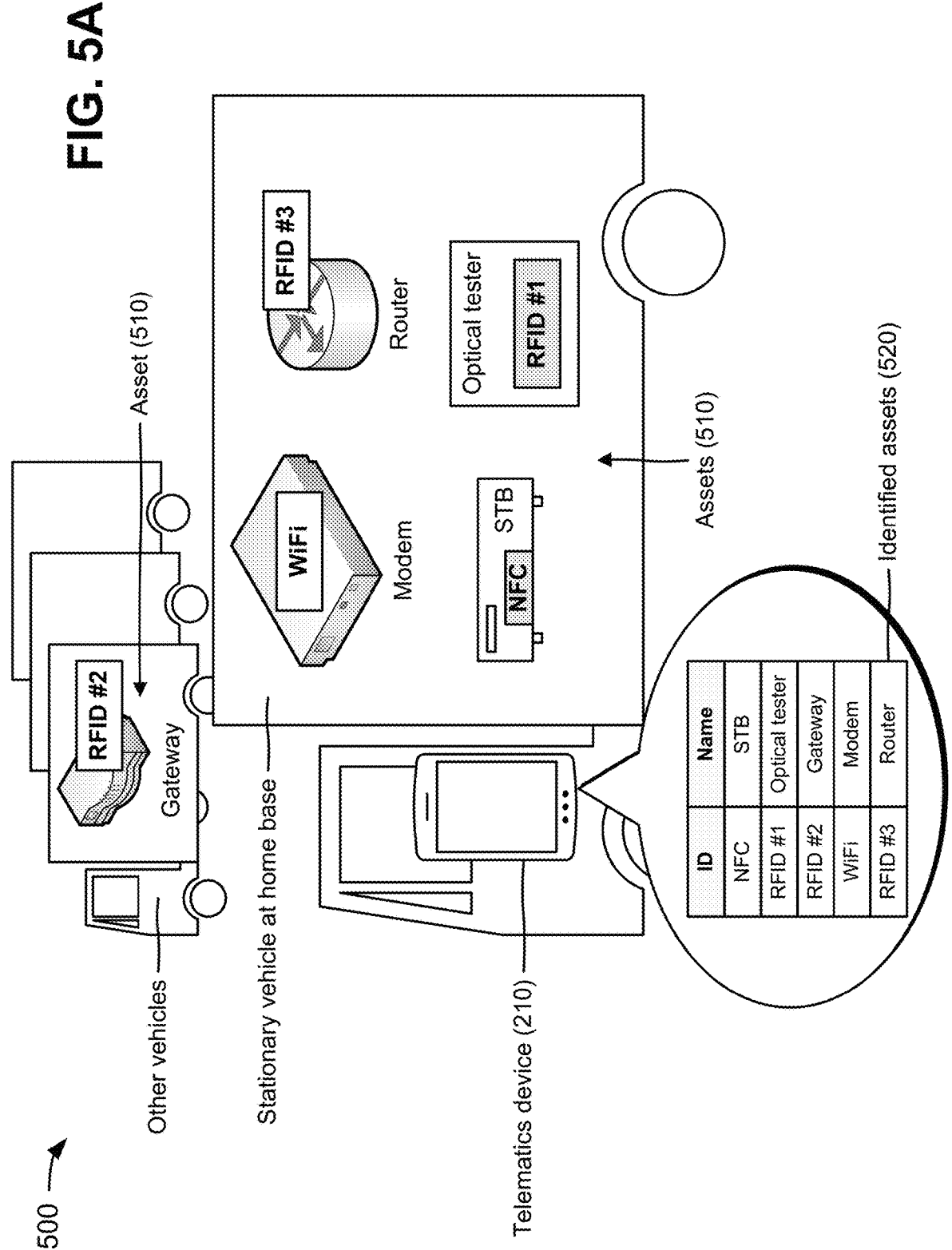

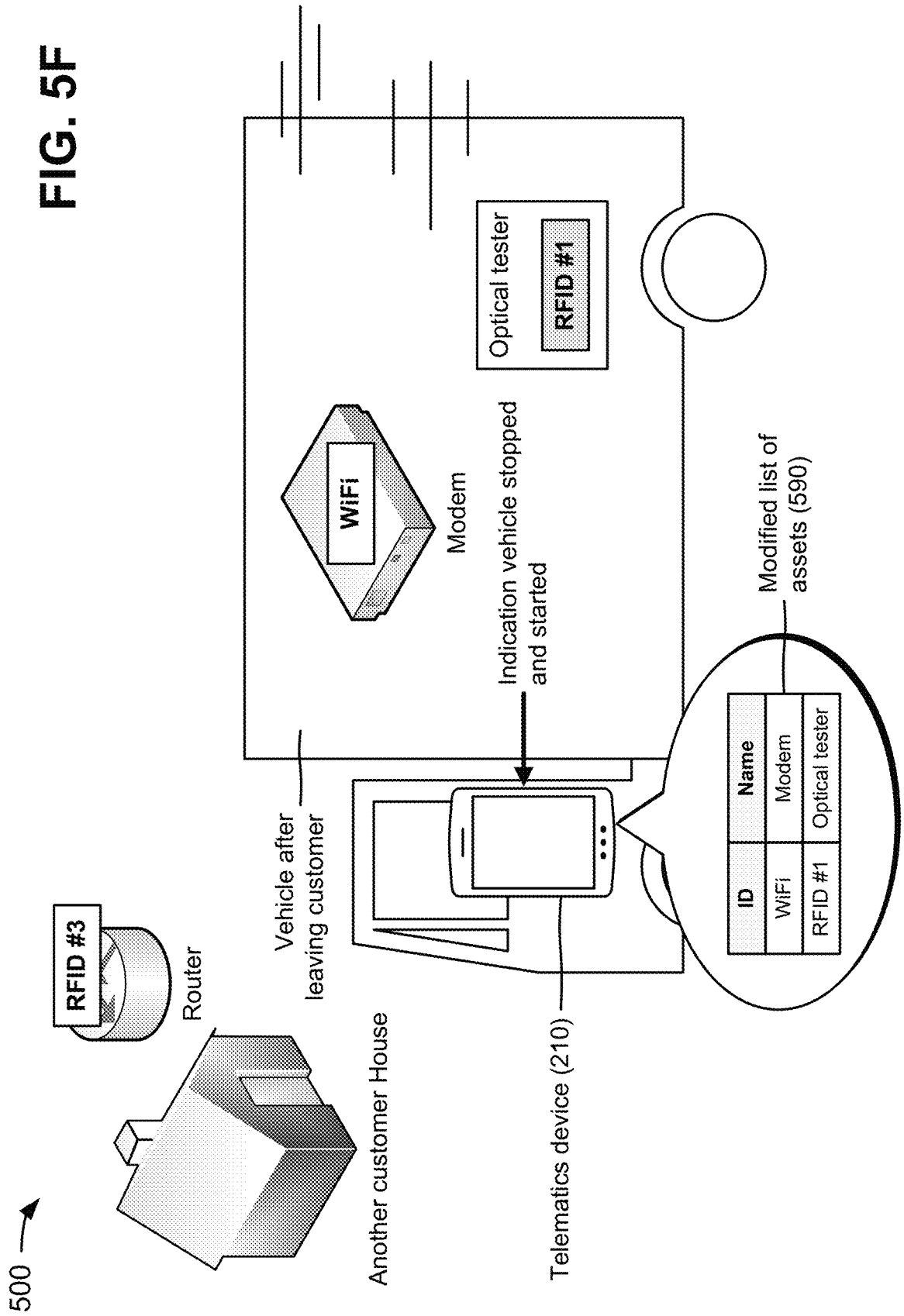

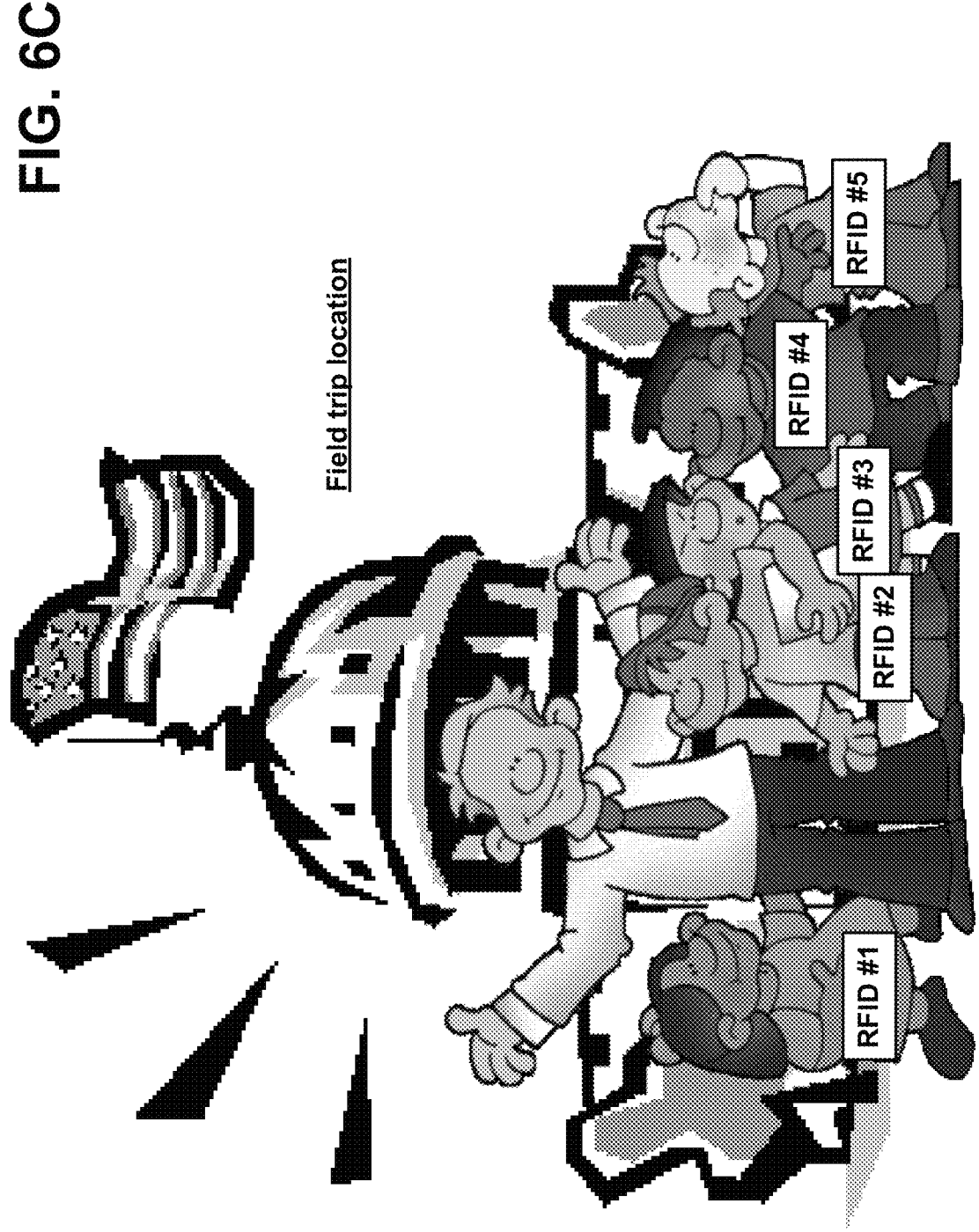

US 10,896,402 B2

SHORT-RANGE WIRELESS DETERMINATION OF A VEHICLE'S ASSET INVENTORY

BACKGROUND

A number of different wireless technologies have been developed for short distances, and are referred to as short-range wireless communications. Signals can travel from a few centimeters to several meters in short-range wireless communications. Examples of short-range wireless communications are Bluetooth classic, Bluetooth low energy, near field communication (NFC), radio-frequency identification (RFID), WiFi, Zigbee, or the like. Bluetooth is a type of wireless communication used to transmit voice and data at high speeds using radio waves, and is a standard protocol for short-range radio communications between many different types of devices (e.g., mobile phones). NFC is an ultra-short-range technology that may be used for secure payment transactions and similar applications. RFID utilizes a reader unit that transmits a radio frequency signal to power passive (unpowered) tags, and reads data stored in memories of the tags. Wi-Fi is the name of a wireless networking technology that uses radio waves to provide wireless high-speed Internet and network connections. ZigBee is a software protocol and technology that implements multiple types of radio networks, such as point-to-point, tree, star, point-to-multipoint, or the like.

BRIEF DESCRIPTION OF THE DRAWINGS

FIG. 2 is a diagram of an example environment in which systems and/or methods, described herein, may be implemented;

FIG. 3 is a diagram of example components of a device that may correspond to one or more of the devices of the environment depicted in FIG. 2;

FIG. 4 is a flow chart of an example process for determining an asset inventory in a vehicle via short-range wireless communications;

FIGS. 5A-5F are diagrams of an example relating to the example process shown in FIG. 4; and FIGS. 6A-6D are diagrams of another example relating to the example process shown in FIG. 4.

DETAILED DESCRIPTION OF PREFERRED EMBODIMENTS

The following detailed description refers to the accompanying drawings. The same reference numbers in different drawings may identify the same or similar elements.

An inventory control system may be used to control, manage, and process assets (e.g., products, equipment, or the like) in an inventory. One type of inventory control system uses barcodes for identifying and tracking assets in an inventory. For example, in a barcode-based inventory control system, a barcode is affixed to each asset, such as each product in a store. When a customer selects a particular product and goes to a checkout counter to pay for the particular product, a cashier scans a barcode for the particular product using a barcode reader. The inventory control system may display information for the particular product, and may specify that the particular product is sold and is no longer in the inventory.

In another example, an employee of a service provider, such as a telecommunications service provider, may load a vehicle with telecommunication assets (e.g., routers, set-top-boxes (STBs), modems, or the like) to be installed at customers' premises by the employee. A user device (e.g., a telematics device, a smart phone, a tablet computer, or the like) associated with the employee or the vehicle may receive information associated with the telecommunication assets from an inventory control system. However, when an asset is installed at a customer's premises or delivered to a customer, the employee must manually enter, in the user device, information indicating that the asset was installed or delivered. If the employee forgets to manually enter such information for one or more assets, the inventory control system will be unable to track the one or more assets.

Systems and/or methods, described herein, may automatically determine an asset inventory in a vehicle, at any time, by utilizing short-range wireless communications between a user device associated with the vehicle and assets of the asset inventory. When an asset of the asset inventory is erroneously left at a customer's premises or erroneously not installed at the customer's premises, the systems and/or methods may provide a notification indicating an error in the asset inventory so that corrective action may be taken. The systems and/or methods may ensure that an asset inventory is correct and up-to-date, and may ensure that assets of the asset inventory are correctly delivered or installed. The systems and/or methods may ensure that assets of the asset inventory are not erroneously left at a customer's premises or stolen from a vehicle.

Figure 1A:
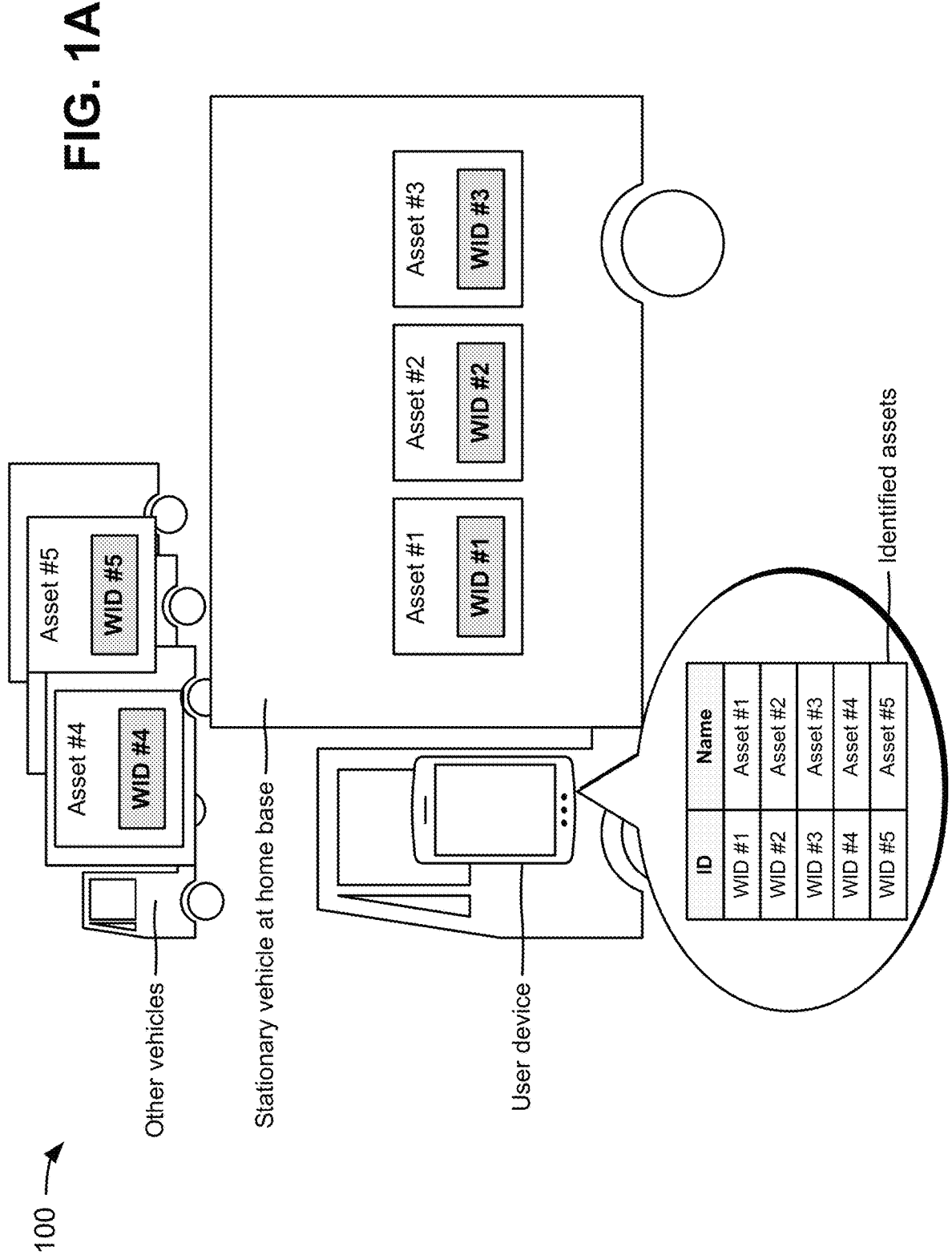
FIGS. 1A-1C are diagrams of an overview of an example implementation described herein.
Figure 1B:
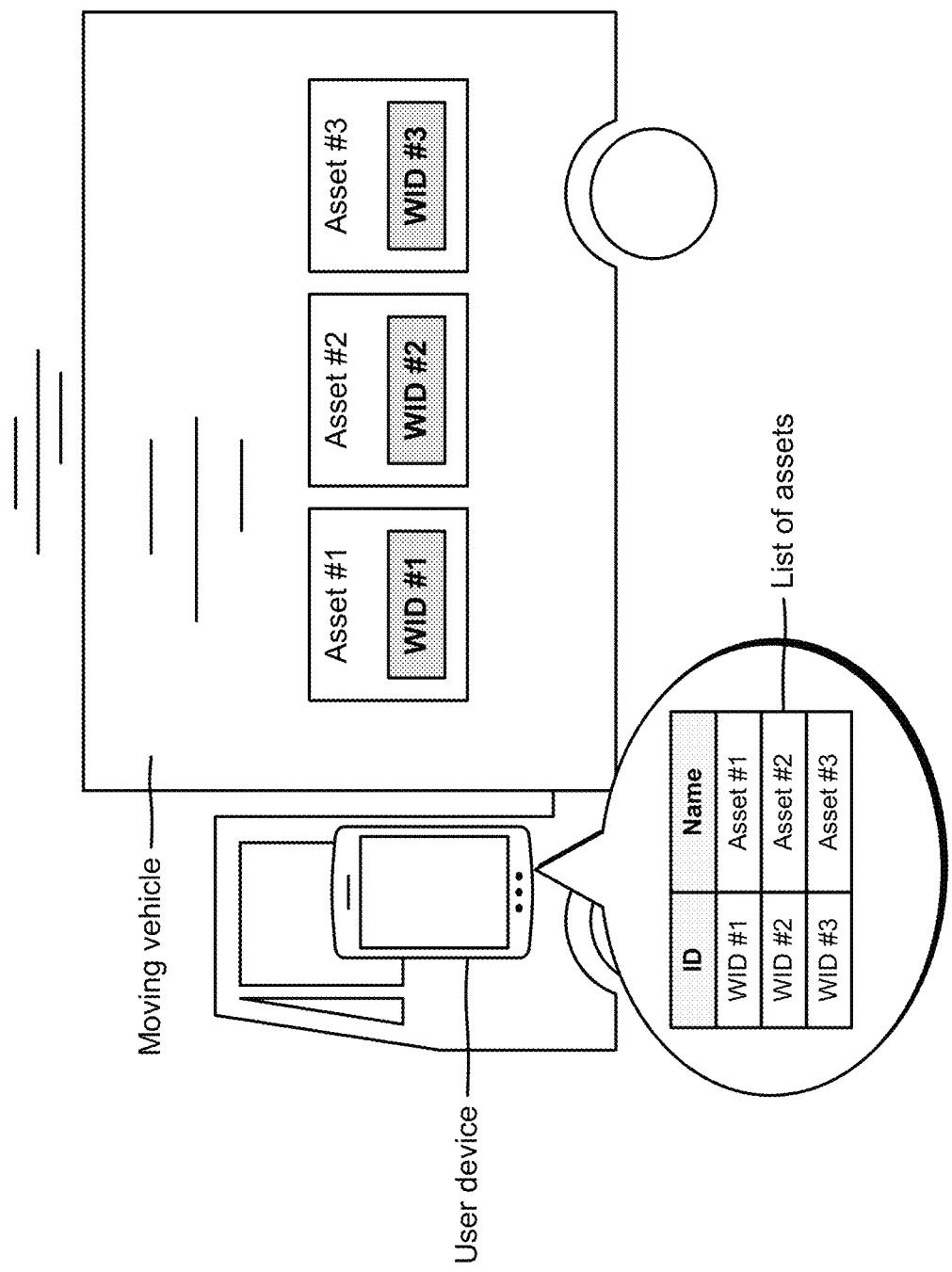
Figure 1C:
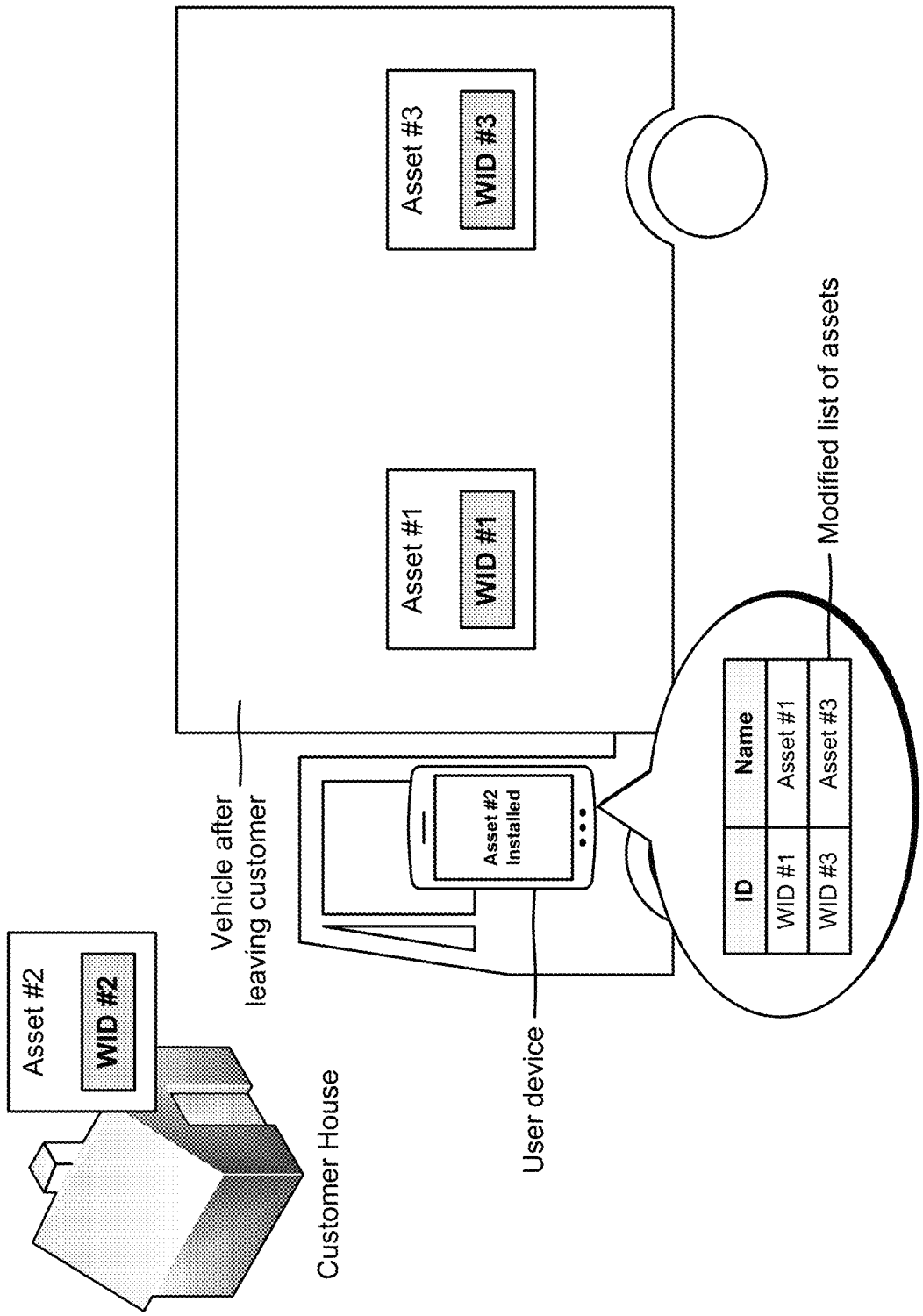

FIGS. 1A-1C are diagrams of an overview of an example implementation 100 described herein. As shown in FIG. 1A, assume that a user device (e.g., a tablet computer, a telematics device, or the like) is associated with a stationary vehicle parked at a home base of a company. Further, assume that the stationary vehicle is loaded with three assets (e.g., Asset #1, Asset #2, and Asset #3) that include wireless identifier (WID) tags (e.g., WID #1, WID #2, and WID #3) providing information associated with corresponding assets. Further, assume that other vehicles are parked near the stationary vehicle and are loaded with assets (e.g., Asset #4 and Asset #5) with corresponding WID tags (e.g., WID #4 and WID #5). As further shown in FIG. 1A, based on the WID tags associated with the assets, the user device may identify a first set of assets that are proximate to the stationary vehicle by using short-range wireless communications with the WID tags. For example, the user device may identify Asset #1, Asset #2, Asset #3, Asset #4, and Asset #5 as the first set of assets.

As shown in FIG. 1B, when the stationary vehicle moves away from the home base and becomes a moving vehicle, the user device may determine that the vehicle is moving and may identify a second set of assets that are proximate to the moving vehicle by using short-range wireless communications with the WID tags. For example, the user device may identify Asset #1, Asset #2, and Asset #3 as the second set of assets. The user device may compare the identified first set of assets and the identified second set of assets to generate a list of assets. As further shown in FIG. 1B, the list of assets may include asset names (e.g., Asset #1, Asset #2, and Asset #3) and asset identifiers (e.g., WID #1, WID #2, and WID #3). The user device may store the list of assets and/or may provide the list of assets to an inventory control system (not shown).

With reference to FIG. 1C, now assume that the vehicle has stopped at a customer house and that Asset #2 has been delivered to the customer. The user device may determine that the vehicle has stopped moving and has started moving again. Based on this determination, the user device may identify a third set of assets that are proximate to the vehicle by using short-range wireless communications with the WID tags. For example, the user device may identify Asset #1 and Asset #3 as the third set of assets. The user device may compare the third set of assets and the list of assets to generate a modified list of assets. For example, the user device may determine that the modified list of assets includes Asset #1 and Asset #3 and identifiers (e.g., WID #1 and WID #3) for these assets. The user device may generate a notification when the assets provided in the third set of assets do not match the assets provided in the list of assets. For example, the user device may determine that Asset #2 is not provided in the third set of assets, and may generate a notification indicating the Asset #2 was installed at the customer house or is missing.

Systems and/or methods, described herein, may automatically determine asset inventories in vehicles, at any time, by utilizing short-range wireless communications between user devices associated with the vehicles and assets of the asset inventory. The systems and/or methods may conserve or save processing resources associated with an inventory control system since management and control of the asset inventory may be provided by the user devices rather than the inventory control system.

FIG. 2 is a diagram of an example environment 200 in which systems and/or methods, described herein, may be implemented. As illustrated, environment 200 may include a user device 210, a server device 220, and a network 230. Devices of environment 200 may interconnect via wired connections, wireless connections, or a combination of wired and wireless connections.

User device 210 may include a device that is capable of communicating over network 230 with server device 220. In some implementations, user device 210 may include a radiotelephone; a personal communications services (PCS) terminal that may combine, for example, a cellular radiotelephone with data processing and data communications capabilities; a smart phone; a notebook computer; a laptop computer; a tablet computer; a telematics device, a dongle attached to the aforementioned devices, or another type of computation and communication device.

Server device 220 may include one or more devices capable of receiving, generating, storing, processing, and/or providing information, such as information described herein. For example, server device 220 may include one or more personal computers, one or more workstation computers, one or more server devices, one or more virtual machines (VMs) provided in a cloud computing environment, or one or more other types of computation and communication devices. In some implementations, server device 220 may be associated with a network service provider that manages and/or operates network 230, such as, for example, a telecommunication service provider, a television service provider, an Internet service provider, or the like. In some implementations, server device 220 may correspond to an inventory control system that controls, manages, and/or processes assets in an inventory.

Network 230 may include one or more wired and/or wireless networks. For example, network 230 may include a cellular network (e.g., a long term evolution (LTE) network, a third generation (3G) network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interpret and executes instructions and can be programmed to perform a function. Processor 320 may include one or more processors. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), a buzzer, an audible device, or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, a serial interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining an asset inventory in a vehicle via short-range wireless communications. In some implementations, one or more process blocks of FIG. 4 may be performed by user device 210 and/or server device 220. In some implementations, one or more process blocks of FIG. 4 may be performed by another device or a group of devices separate from or including user device 210 and/or server device 220.

As shown in FIG. 4, process 400 may include identifying first assets proximate to a stationary vehicle by using short-range wireless communications (block 410). For example, user device 210 may be associated with a stationary vehicle, and user device 210 may identify first assets proximate to the stationary vehicle by using short-range wireless communications with the assets. An asset may be proximate to the stationary vehicle when the asset is within a short-range communication range with user device 210. In some implementations, the stationary vehicle may be associated with an entity that manages, sells, and/or owns the assets. In some implementations, an asset may be identified as proximate to the stationary vehicle (e.g., a first asset) when user device 210 can utilize the short-range wireless communications to communicate with the asset. In some implementations, user device 210 may store information identifying the first assets (e.g., in memory 330 and/or storage component 340, FIG. 3).

In some implementations, the short-range wireless communications may be provided by short-range wireless technologies, such as, for example, Bluetooth classic technologies, Bluetooth low energy technologies, infrared technologies, NFC technologies, RFID technologies, WiFi technologies, ZigBee technologies, or the like. In such implementations, user device 210 may utilize the short-range wireless technologies to communicate with and identify wireless identifiers associated with the assets. For example, the assets and user device 210 may include Bluetooth functionality that enables user device 210 to communicate with and identify the assets. In another example, the assets may include NFC/RFID tags that are powered by a NFC/RFID signal transmitted by user device 210, and communicate asset identification information to user device 210 when powered. In still another example, the assets and user device 210 may include WiFi functionality that enables user device 210 to communicate with and identify the assets. In some implementations, a short-range wireless technology may be incorporated within an asset (e.g., a router may be WiFi enabled) and/or user device 210. In some implementations, a short-range wireless technology may be provided in a device (e.g., a tag) that is affixed to an asset and/or connected to an asset and/or user device 210.

In some implementations, user device 210 may receive, from server device 220, information associated with assets to be transported by the stationary vehicle. User device 210 may compare the information associated with the assets to be transported with the identified first assets to verify that all of the assets to be transported are loaded on the stationary vehicle. For example, if the stationary vehicle is to transport ten routers to ten different customers and user device 210 identifies nine routers proximate to the stationary vehicle, user device 210 may determine that the stationary vehicle is missing one router and may notify a user of user device 210. In some implementations, user device 210 may provide information identifying the first assets to server device 220, and server device 220 may verify that all of the assets to be transported are loaded on the stationary vehicle based on the information.

As further shown in FIG. 4, process 400 may include identifying second assets proximate to the vehicle, when the vehicle is moving and using short-range wireless communications (block 420). For example, user device 210 may identify second assets proximate to the vehicle, when the vehicle is moving and using short-range wireless communications with the assets. In some implementations, user device 210 may determine that the vehicle is moving based on a global positioning system (GPS) component, an accelerometer component, or the like, provided in user device 210. In some implementations, user device 210 may receive an indication that the vehicle is moving from the vehicle. In some implementations, user device 210 may determine that the vehicle is moving when a trigger is satisfied (e.g., when the vehicle is moving at a particular threshold speed, when the vehicle is moving for particular threshold time period, or the like). Such a trigger may ensure that user device 210 does not incorrectly determine that the vehicle is moving, such as during routine stop and go traffic scenarios, or the like. When user device 210 determines that the vehicle is moving, user device 210 may utilize the short-range wireless communications to communicate with the assets and identify the second assets proximate to the vehicle, in a manner described above with respect to block 410. In some implementations, user device 210 may store information identifying the second assets (e.g., in memory 330 and/or storage component 340, FIG. 3).

In some implementations, user device 210 may receive, from server device 220, information associated with assets to be transported by the moving vehicle. User device 210 may compare the information associated with the assets to be transported with the identified second assets to verify that all of the assets to be transported are loaded on the moving vehicle. In some implementations, user device 210 may provide information identifying the second assets to server device 220, and server device 220 may verify that all of the assets to be transported are loaded on the moving vehicle based on the information. In some implementations, a remote device may provide queries to server device 220 for updates of a specific vehicle's inventory, for identification of a specific piece of equipment in a fleet of vehicles, or the like, and server device 220 may provide such information to the remote device.

As further shown in FIG. 4, process 400 may include comparing the identified first assets and the identified second assets to generate a list of assets (block 430). For example, user device 210 may compare the identified first assets and the identified second assets to generate a list of assets. In some implementations, the list of assets may include a list of the identified second assets. In some implementations, if the identified first assets match the identified second assets, the list assets may include a list of the identified first assets. In some implementations, a number of the identified first assets may be greater than a number of the identified second assets since the stationary vehicle may have been parked near particular assets (e.g., in other vehicles) that are not to be transported by the vehicle. In such implementations, user device 210 may detect and identify the particular assets as first assets, but may not detect and identify the particular assets as second assets. Furthermore, in such implementations, the list of assets may include a list of the identified second assets.

As further shown in FIG. 4, process 400 may include storing the list of assets and/or providing the list of assets to a server device (block 440). For example, user device 210 may store the list of assets (e.g., in memory 330 and/or storage component 340, FIG. 3), and/or may provide the list of assets to server device 220. In some implementations, server device 220 may compare the list of assets with information associated with the assets to be transported to verify that all of the assets to be transported are loaded on the moving vehicle. For example, assume that the list of assets includes a list of five modems and that moving vehicle is to transport six modems. In such an example, server device 220 may determine that the moving vehicle is missing one modem, and may provide a notification, to user device 210, indicating that the moving vehicle is missing one modem. In some implementations, user device 210 may receive, from server device 220, information associated with assets to be transported by the moving vehicle. User device 210 may compare the information associated with the assets to be transported with the list of assets to verify that all of the assets to be transported are loaded on the moving vehicle.

As further shown in FIG. 4, process 400 may include receiving an indication that the vehicle has stopped moving and has started moving again (block 450). For example, user device 210 may receive an indication that the vehicle has stopped moving and has started moving from the vehicle and/or from a GPS component, an accelerometer component, or the like, provided in user device 210. In some implementations, the indication may be received by user device 210 when the vehicle has stopped moving for a particular period of time (e.g., in minutes, hours, or the like) and has started moving after the particular period of time. The indication may indicate to user device 210 that the vehicle has stopped at a location (e.g., a customer's premises) so that a driver of the vehicle (e.g., a user of user device 210) may deliver an asset(s) to the customer and/or install an asset(s) at the customer's premises. The particular time period may be used to prevent user device 210 from receiving the indication during routine stop-and-go driving conditions. In some implementations, user device 210 may determine that the vehicle has stopped moving and has started moving when a trigger is satisfied (e.g., when the vehicle has stopped moving for more than a threshold time period and then started moving, or the like).

In some implementations, the indication may be received by user device 210 when the vehicle has stopped moving, the engine is turned off, the engine is turned on again, and the vehicle has started moving again. In some implementations, a user of user device 210 may provide, to user device 210, information indicating that the vehicle has stopped for an asset delivery or installation. In such implementations, user device 210 may receive the indication when the vehicle starts moving after receiving the information from the user. In some implementations, user device 210 may receive known locations of customers from server device 220, and may match known locations of customers to stop locations. In such implementations, a threshold time period associated with when a vehicle stopped moving may be different if the vehicle stops at a known location of a customer, or the threshold time period may be eliminated at a known location of a customer.

As further shown in FIG. 4, process 400 may include identifying third assets proximate to the vehicle, when the vehicle is moving again and using short-range wireless communications (block 460). For example, user device 210 may identify third assets proximate to the vehicle, when the vehicle is moving again and using short-range wireless communications with the assets. In some implementations, user device 210 may determine that the vehicle is moving again based on receiving the indication that vehicle has stopped moving and has started moving again. When user device 210 determines that the vehicle is moving again, user device 210 may utilize the short-range wireless communications to communicate with the assets and identify the third assets proximate to the vehicle, in a manner described above with respect to block 410. In some implementations, user device 210 may store information identifying the third assets (e.g., in memory 330 and/or storage component 340, FIG. 3).

In some implementations, user device 210 may receive, from server device 220, information associated with remaining assets to be transported by the moving vehicle (e.g., after stopping a customer's premises and delivering an asset(s) to the customer or installing an asset(s) at the customer premises). User device 210 may compare the information associated with the remaining assets to be transported with the identified third assets to verify that the remaining assets to be transported are loaded on the moving vehicle. In some implementations, user device 210 may provide information identifying the third assets to server device 220, and server device 220 may verify that the remaining assets to be transported are loaded on the moving vehicle based on the information. In some implementations, user device 210 may receive, from server device 210, a list of customers and assets to be delivered to or installed for the customers, and may check the list of customers and assets against an expected list of assets after every install or delivery at a customer location.

As further shown in FIG. 4, process 400 may include comparing the identified third assets and the list of assets to generate a modified list of assets (block 470). For example, user device 210 may compare the identified third assets and the list of assets to generate a modified list of assets. In some implementations, the modified list of assets may include a list of the identified third assets, and the identified third assets may not be compared to the list of assets. In some implementations, if the identified third assets match the list of assets, the modified list of assets may be the same as the list of assets. In some implementations, a number of assets provided in the list of assets may be greater than a number of the identified third assets since the driver of the vehicle may have delivered an asset(s) to a customer or installed an asset(s) at the customer's premises. In such implementations, user device 210 may determine that an asset(s) included in the list of assets, but not included in the identified third assets, was delivered to the customer or installed at the customer's premises. In some implementations, user device 210 may store the modified list of assets (e.g., in memory 330 and/or storage component 340, FIG. 3), and/or may provide the modified list of assets to server device 220.

As further shown in FIG. 4, process 400 may include generating a notification when the identified third assets do not match assets provided in the list of assets (block 480). For example, user device 210 may generate a notification when the identified third assets do not match assets provided in the list of assets, based on the comparison of the identified third assets and the list of assets. In some implementations, user device 210 may include a list (e.g., received from server device 220) of what assets should be on the vehicle before each stop and what assets should be on the vehicle after each stop, and may generate notifications accordingly after each stop. In some implementations, the notification may indicate that an asset(s) was delivered to a customer or installed at a customer's premises; that an asset was erroneously left at the customer's premises (e.g., an installation tool may be left behind and notification may provide the customer's location); that an asset(s) was erroneously delivered to a customer or installed at a customer's premises; that an asset(s) is missing from the vehicle; or the like. In some implementations, the notification may be displayed to a user of user device 210 and/or may be associated with a sound, an audible alert, a vibration, or the like, generated by user device 210. In some implementations, when user device 210 is a telematics device installed in the vehicle, user device 210 may provide the notification to a mobile device associated with the driver of the vehicle, via a short message service (SMS) message, a telephone call, an email message, or the like.

In some implementations, when GPS is unavailable, user device 210 may utilize short-range wireless communications to determine a location of user device 210 and/or the vehicle. For example, user device 210 may receive short-range communication signals from a location associated with user device 210 (e.g., WiFi signals, RFID signals, or the like, generated at the location), and may analyze the received short-range communication signals to determine the location of user device 210. For example, user device 210 and/or server device 220 may have records of locations associated with various equipment and/or other user devices 210 provided on other vehicles, and based on received short-range wireless signals containing known device identifiers, user device 210 and/or server device 220 may be able to determine the location of user device 210.

In some implementations, determining an asset inventory via user device 210 and short-range wireless communications with assets may save processing resources associated with server device 220 (e.g., an inventory control system). For example, since asset inventories associated with vehicles may be controlled, processed, and/or monitored by user devices 210 associated with the vehicles, server device 220 need not control, process, and/or monitor such assets and processing resources of server device 220 may be saved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
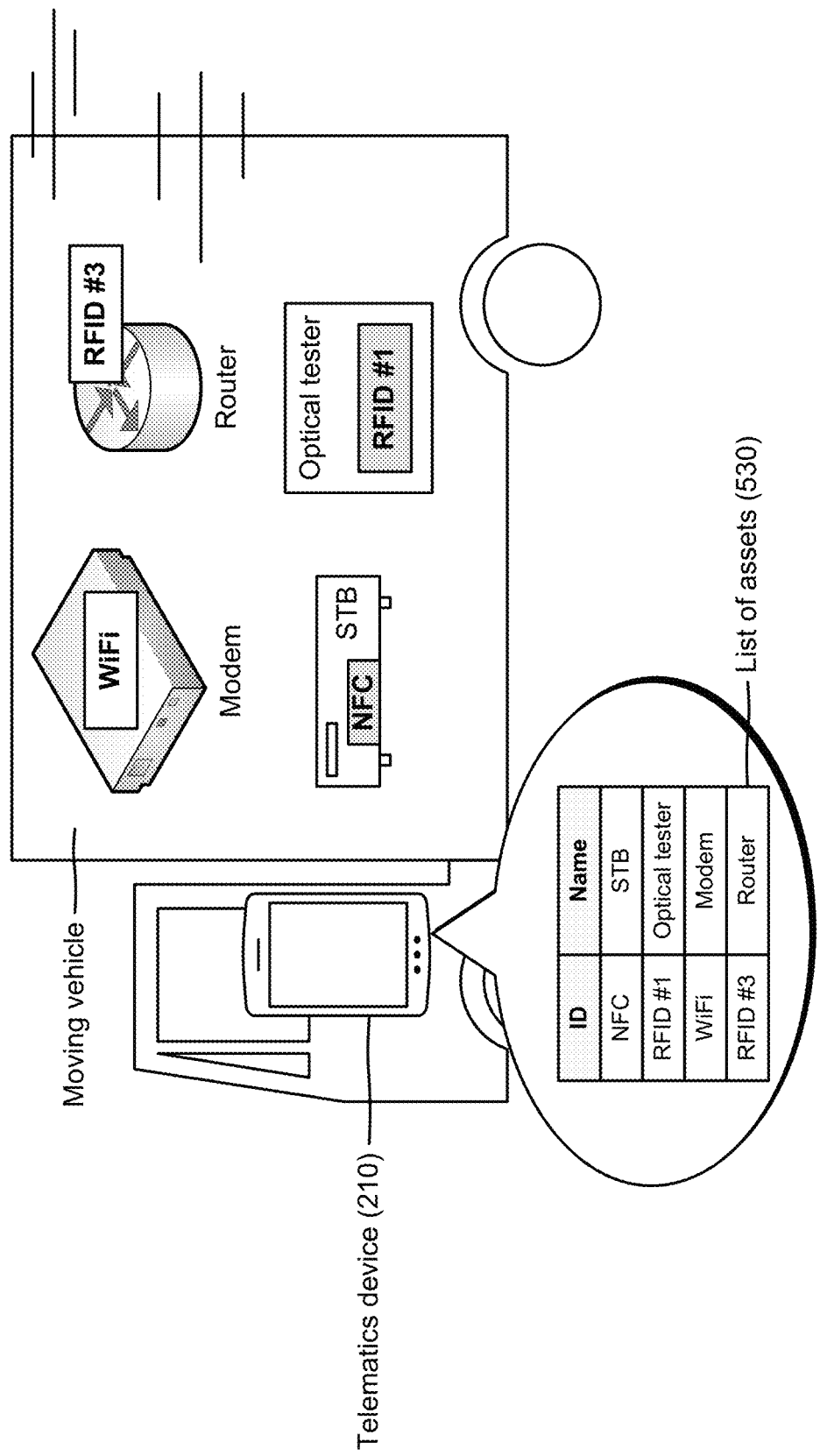

FIGS. 5A-5F are diagrams of an example 500 relating to example process 400 shown in FIG. 4. As shown in FIG. 5A, assume that a telematics device 210 is provided in a stationary vehicle parked at a home base of a telecommunications company. Further, assume that the stationary vehicle is loaded with four telecommunications assets 510 (e.g., a modem, a router, a STB, and an optical tester). The modem is WiFi enabled, and the STB includes a NFC tag that provides information associated with the STB. The optical tester includes a RFID tag (e.g., RFID #1) that provides information associated with the optical tester, and the router includes a RFID tag (e.g., RFID #3) that provides information associated with the optical tester. Further, assume that other vehicles are parked near the stationary vehicle and are loaded with a telecommunications asset 510 (e.g., a gateway) with a corresponding RFID tag (e.g., RFID #2). As further shown in FIG. 5A, based on the WiFi capability, the NFC tag, and the RFID tags associated with telecommunications assets 510, telematics device 210 may identify assets 520 that are proximate to the stationary vehicle by using short-range wireless communications via the WiFi or with the NFC tag and the RFID tags. For example, telematics device 210 may identify the STB, the optical tester, the gateway, the modem, and the router as identified assets 520.

As shown in FIG. 5B, when the stationary vehicle moves away from the home base and becomes a moving vehicle, telematics device 210 may determine that the vehicle is moving and may identify telecommunications assets 510 that are proximate to the moving vehicle by using short-range wireless communications via the WiFi or with the NFC tag and the RFID tags. For example, telematics device 210 may identify the modem, the router, the STB, and the optical tester as assets. Telematics device 210 may utilize the identified assets to generate a list of assets 530. As further shown in FIG. 5B, list of assets 530 may include asset names (e.g., STB, optical tester, modem, and router) and corresponding asset identifiers (e.g., NFC, RFID #1, WiFi, and RFID #3).

Figure 5C:
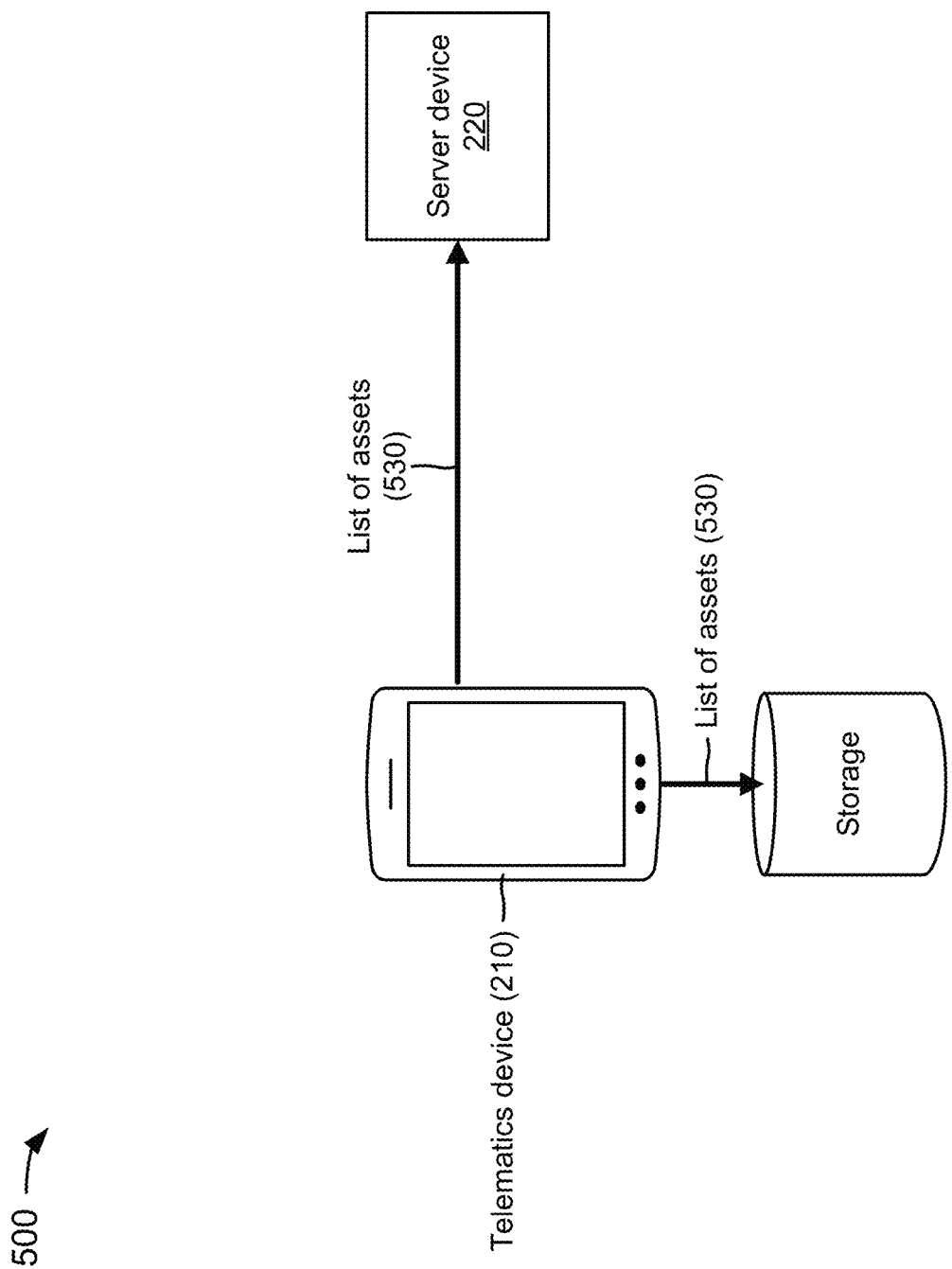

As shown in FIG. 5C, telematics device 210 may store list of assets 530 in a storage device associated with telematics device 210 (e.g., memory 330 and/or storage component 340, FIG. 3). Alternatively, or additionally, telematics device 210 may provide list of assets 530 to server device 220. Server device 220 may store list of assets 530, and may utilize list of assets 530 to manage telecommunications assets 510 associated with the moving vehicle. For example, server device 220 may verify that the moving vehicle has the correct telecommunications assets 510, based on list of assets 530, and may notify a driver of the vehicle when the vehicle has incorrect telecommunications assets 510.

Figure 5D:
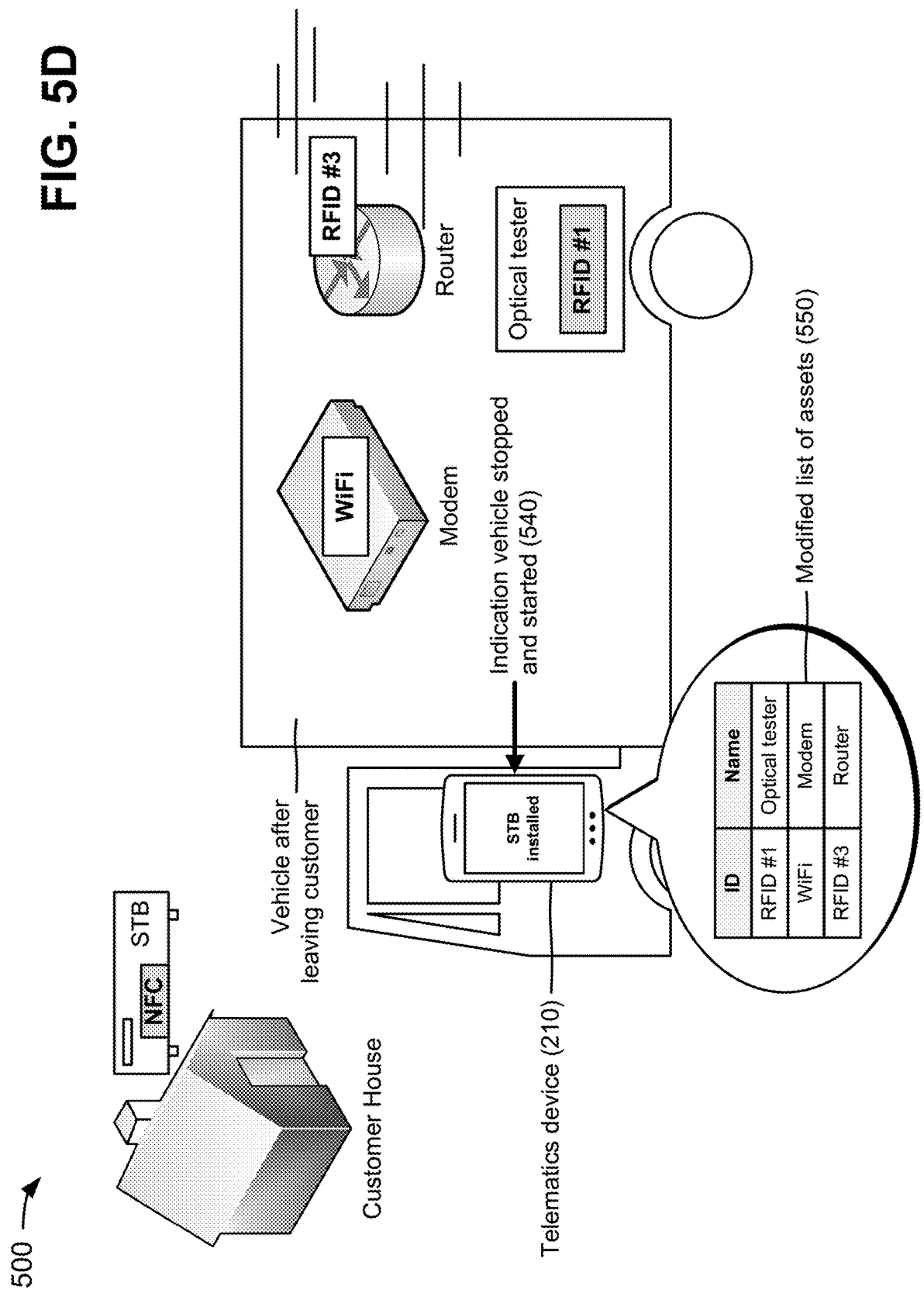

With reference to FIG. 5D, now assume that the vehicle has stopped at a customer house and that the STB has been installed at the customer house. Telematics device 210 may determine or receive an indication 540 (e.g., from the vehicle or from components of telematics device 210) that the vehicle has stopped moving and has started moving again (e.g., after a particular time period). Based on this determination, telematics device 210 may identify telecommunications assets 510 that are proximate to the vehicle by using short-range wireless communications via the WiFi or with the RFID tags. For example, telematics device 210 may identify the modem, the router, and the optical tester as being proximate to the vehicle. Telematics device 210 may generate a modified list of assets 550 based on the identified assets. For example, telematics device 210 may determine that modified list of assets 550 includes the optical tester, the modem, and the router, and corresponding identifiers (e.g., RFID #1, WiFi, and RFID #3) for these assets. Telematics device 210 may generate a notification when the assets provided in list of assets 530 do not match the assets provided in modified list of assets 550. For example, telematics device 210 may determine that the STB is not provided in modified list of assets 550, and may generate a notification indicating that the STB was installed at the customer house, as shown in FIG. 5D.

Figure 5E:
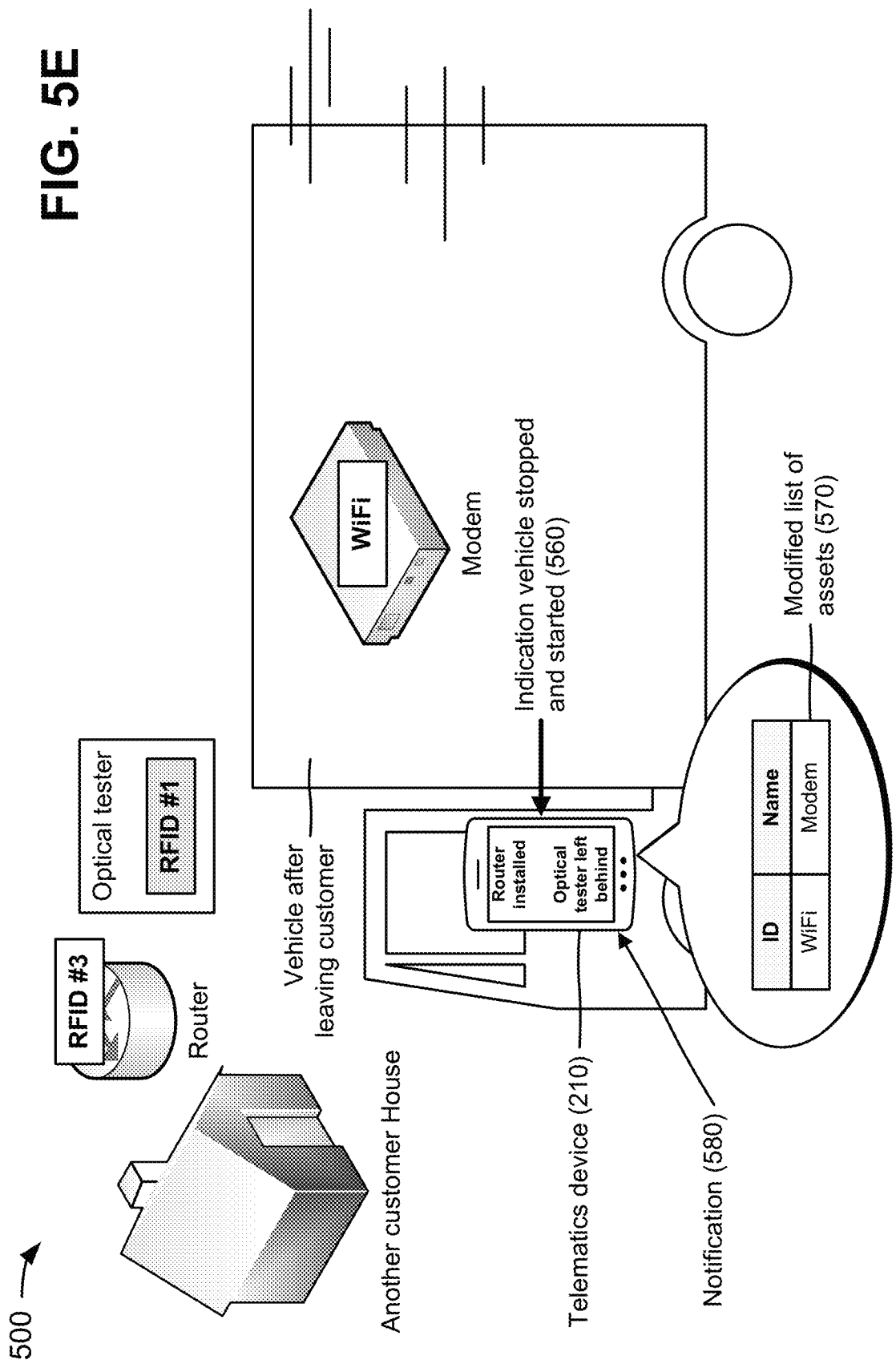

With reference to FIG. 5E, now assume that the vehicle has stopped at another customer house, that the router has been installed at the other customer house, and that the optical tester was erroneously left at the other customer house. Telematics device 210 may determine or receive an indication 560 that the vehicle has stopped moving and has started moving again. Based on this determination, telematics device 210 may identify telecommunications assets 510 that are proximate to the vehicle by using short-range wireless communications via the WiFi. For example, telematics device 210 may identify the modem as being proximate to the vehicle. Telematics device 210 may generate another modified list of assets 570 based on the identified assets. For example, telematics device 210 may determine that modified list of assets 570 includes the modem and a corresponding identifier (e.g., WiFi). Telematics device 210 may generate a notification when the assets provided in modified list of assets 550 do not match the assets provided in modified list of assets 570. For example, telematics device 210 may determine that the router and the optical tester are not provided in modified list of assets 570, and may generate a notification 580 indicating that the router was installed at the other customer house (e.g., since telematics device 210 may know that router is to be installed at the other customer house based on an expected list of assets to install/delivery) and that the optical tester was left behind (e.g., since telematics device 210 may know that the optical tester is not to be installed or delivered based on the expected list), as shown in FIG. 5E.

As shown in FIG. 5F, assume that the vehicle returns to the other customer house, and that the optical tester is retrieved and loaded on the vehicle. Telematics device 210 may determine or receive an indication that the vehicle has stopped moving and has started moving again. Based on this determination, telematics device 210 may identify telecommunications assets 510 that are proximate to the vehicle by using short-range wireless communications via the WiFi or with the RFID tag. For example, telematics device 210 may identify the modem and the optical tester as being proximate to the vehicle. Telematics device 210 may generate another modified list of assets 590 based on the identified assets. For example, telematics device 210 may determine that modified list of assets 590 includes the modem and the optical tester, and corresponding identifiers (e.g., WiFi and RFID #1) for the assets.

As indicated above, FIGS. 5A-5F are provided merely as an example. Other examples are possible and may differ from what was described with regard to FIGS. 5A-5F. In some implementations, the various operations described in connection with FIGS. 5A-5F may be performed automatically or at the request of a user.

Figure 6A:
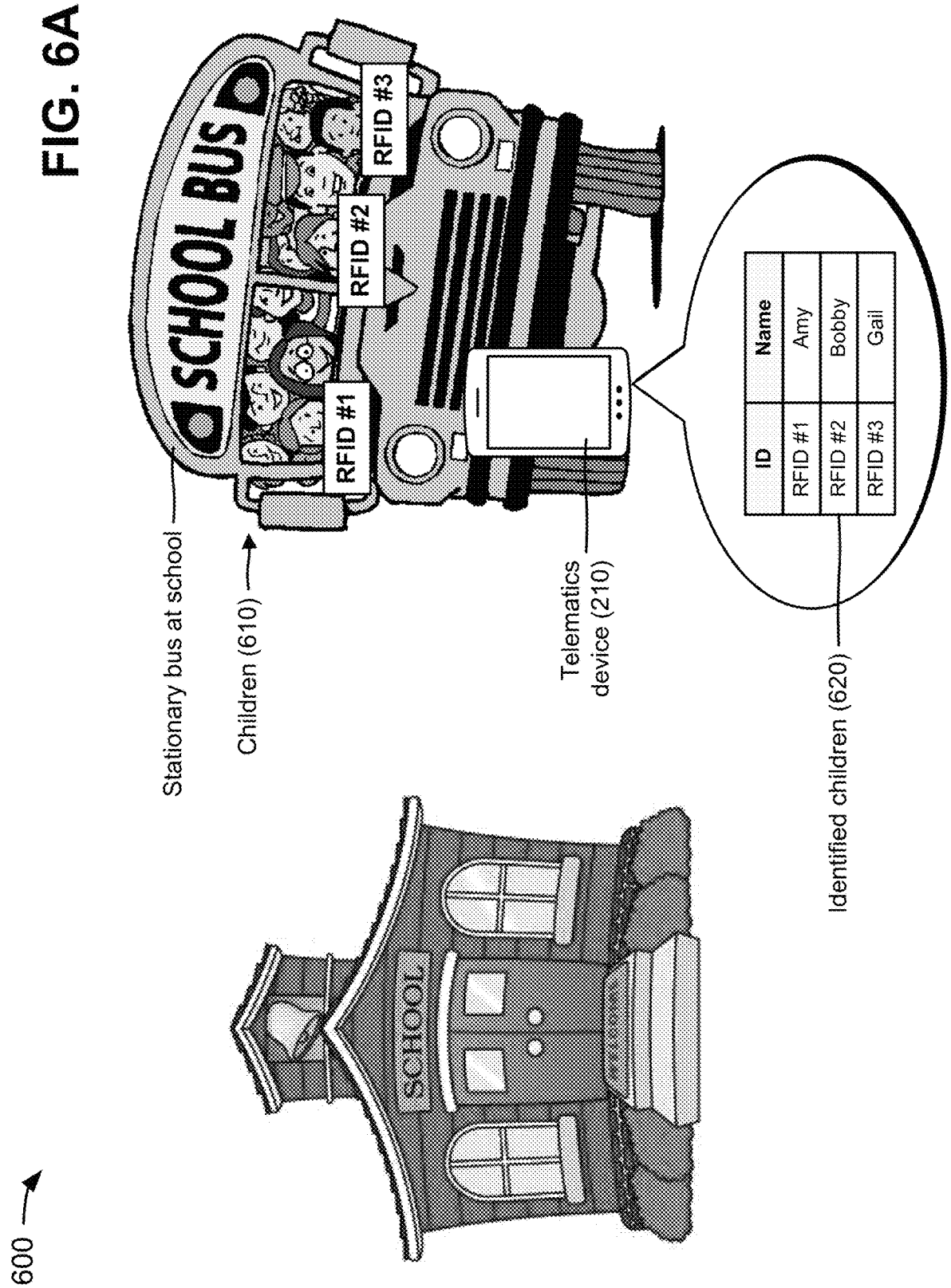

FIGS. 6A-6D are diagrams of another example 600 relating to example process 400 shown in FIG. 4. As shown in FIG. 6A, assume that a telematics device 210 is provided in a stationary bus parked at a school, and that the bus is being used to transport children to a field trip location. Further, assume that the stationary bus is loaded with children 610, and that each child is wearing a RFID tag that identifies the child. As further shown in FIG. 6A, based on the RFID tags associated with children 610, telematics device 210 may identify children 620 that are proximate to the stationary bus using short-range wireless communications with the RFID tags. For example, telematics device 210 may identify Amy, Bobby, and Gail, among others, as identified children 620.

Figure 6B:
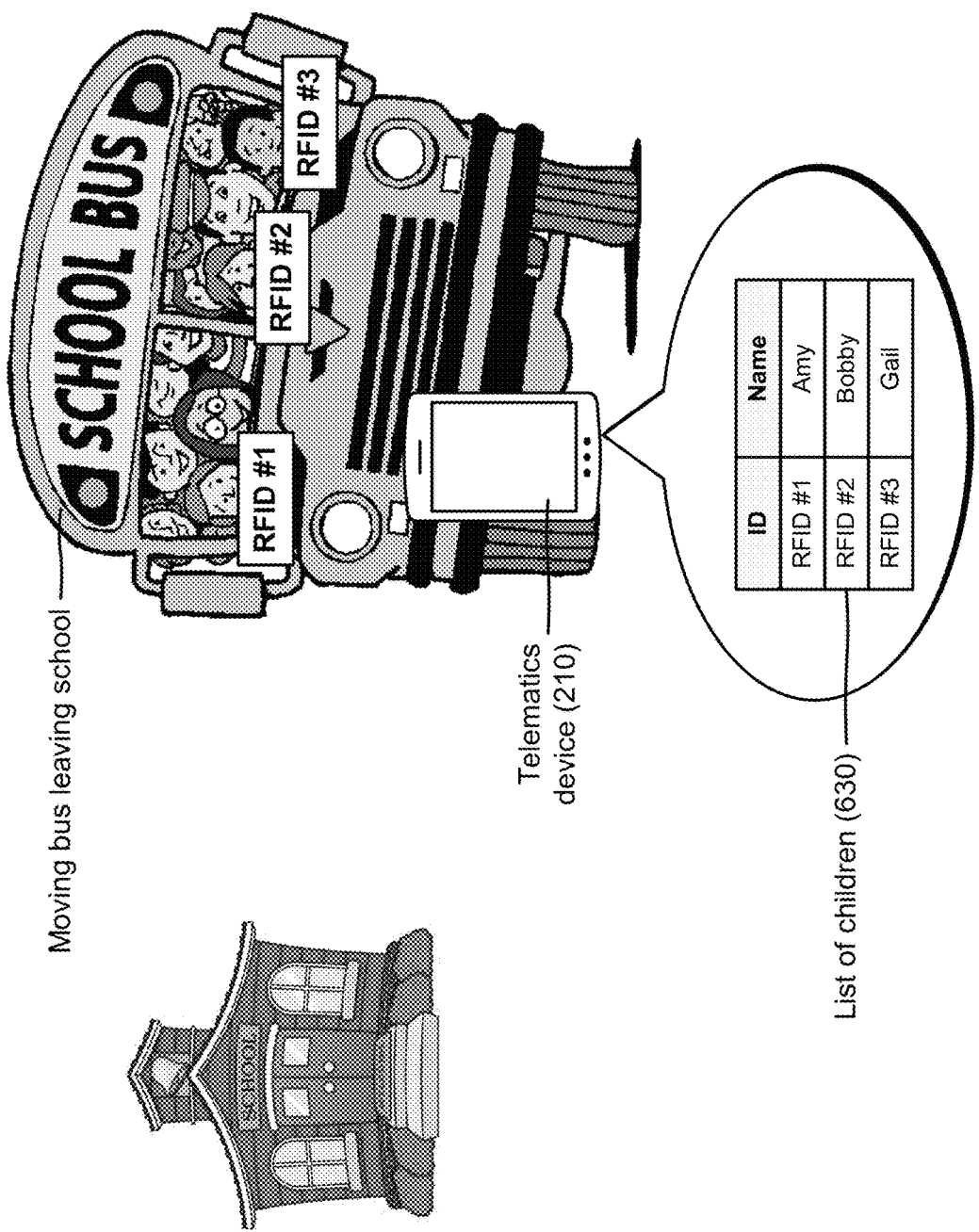

As shown in FIG. 6B, when the bus moves away from the school and becomes a moving bus, telematics device 210 may determine that the bus is moving and may identify children 610 that are proximate to the moving bus using short-range wireless communications with the RFID tags. For example, telematics device 210 may identify Amy, Bobby, and Gail, among others, based on their RFID tags. Telematics device 210 may utilize information associated with the identified children to generate a list of children 630. As further shown in FIG. 6B, list of children 630 may include children names (e.g., Amy, Bobby, and Gail) and corresponding identifiers (e.g., RFID #1 for Amy, RFID #2 for Bobby, and RFID #3 for Gail).

With reference to FIG. 6C, now assume that the bus travels to the field trip location, and the children exit the bus and enjoy a nice day at the field trip location. When the field trip is over, the children enter the bus and the bus begins to leave the field trip location, as shown in FIG. 6D.

Figure 6D:
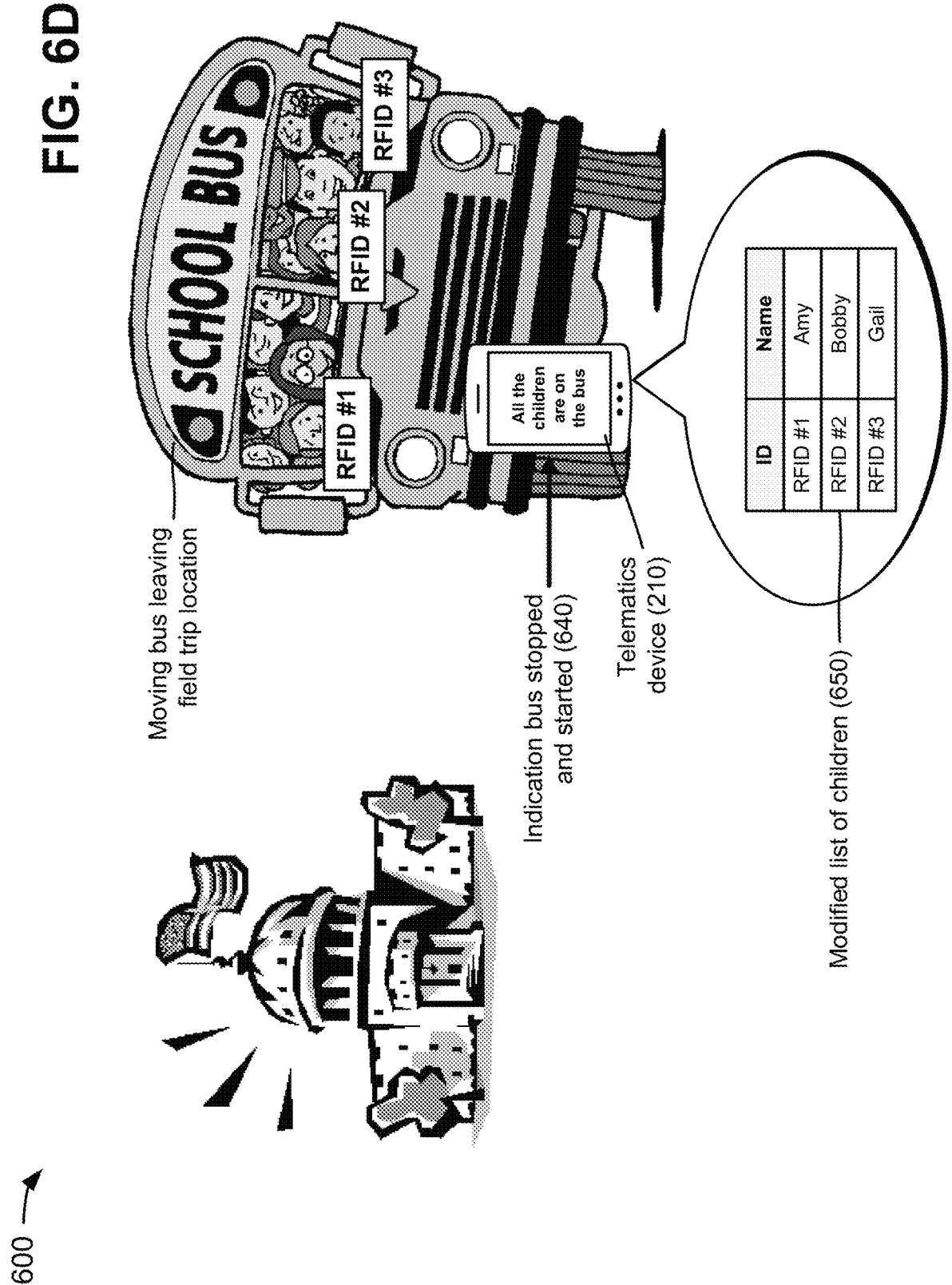

As further shown in FIG. 6D, telematics device 210 may determine or receive an indication 640 that the bus has stopped moving and has started moving again (e.g., after a particular time period). Based on this determination, telematics device 210 may identify children 610 that are proximate to the bus using short-range wireless communications with the RFID tags. For example, telematics device 210 may identify Amy, Bobby, and Gail, among others, as being proximate to the bus. Telematics device 210 may generate a modified list of children 650 based on the identified children. For example, telematics device 210 may determine that modified list of children 650 includes Amy, Bobby, and Gail, among others, and corresponding identifiers (e.g., RFID #1, RFID #2, and RFID #3) for these children. Telematics device 210 may generate a notification when the children provided in list of children 630 match or do not match the children provided in modified list of children 650. For example, telematics device 210 may determine that the children provided in list of children 630 match the children provided in modified list of children 650, and may generate a notification indicating that all of the children are on the bus, as shown in FIG. 6D.

As indicated above, FIGS. 6A-6D are provided merely as an example. Other examples are possible and may differ from what was described with regard to FIGS. 6A-6D. In some implementations, the various operations described in connection with FIGS. 6A-6D may be performed automatically or at the request of a user.

Systems and/or methods, described herein, may provide a user device that automatically determines an asset inventory in a vehicle, on the fly, by utilizing short-range wireless communications with assets of the asset inventory.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, by a device, a first trigger indicating that a vehicle is moving at more than a threshold velocity for more than a first threshold time period;
   identifying, by the device and at a first time, a plurality of first assets proximate to the vehicle based on the first trigger and using short-range wireless communications, associated with a short-range wireless technology, between the plurality of first assets and the device;
   receiving, by the device, location information identifying a location of a premises of a customer;
   determining, by the device and at a second time, that the vehicle has stopped at the premises of the customer based on the vehicle being stopped for more than a second threshold time period at the location;
   detecting, by the device after determining that the vehicle has stopped at the premises of the customer, a second trigger indicating that the vehicle is moving at more than the threshold velocity for more than the first threshold time period;
   identifying, by the device, at a third time after the second time, and based on detecting the second trigger indicating that the vehicle is moving at more than the threshold velocity for more than the first threshold time period, one or more second assets proximate to the vehicle using the short-range wireless communications between the one or more second assets and the device;
   comparing, by the device and at the third time or at a fourth time after the third time, information identifying the plurality of first assets at the first time and information identifying the one or more second assets at the third time;
   determining, by the device, that at least one particular asset, of the plurality of first assets, is not included in the one or more second assets based on comparing the information identifying the plurality of first assets at the first time and the information identifying the one or more second assets at the third time; and
   generating, by the device,
      a notification indicating that the at least one particular asset has been erroneously left at the premises of the customer when the at least one particular asset is on a list of assets to be on the vehicle at the third time.

2. The method of claim 1, further comprising:
   storing another list of assets that includes the information identifying the plurality of first assets at the first time;
   storing a modified list of assets that includes the information identifying the one or more second assets at the third time; and
   providing the other list of assets and the modified list of assets to a server device that provides inventory control of assets.

3. The method of claim 1, where the short-range wireless technology includes one of:
   an infrared technology,
   a near field communication (NFC) technology, or
   a radio-frequency identification (RFID) technology.

4. The method of claim 1, further comprising:
   generating a first list of assets that includes the information identifying the plurality of first assets at the first time; and
   generating a second list of assets that includes the information identifying the one or more second assets at the third time.

5. The method of claim 1, further comprising:
   establishing the short-range wireless communications between the plurality of first assets and the device; and
   identifying the plurality of first assets based on establishing the short-range wireless communications between the plurality of first assets and the device.

6. The method of claim 1, further comprising:
   establishing the short-range wireless communications between the one or more second assets and the device; and
   identifying the one or more second assets based on establishing the short-range wireless communications between the one or more second assets and the device.

7. The method of claim 1, where the first trigger and the second trigger are received from one or more components of the device or from the vehicle.

8. A device, comprising:
a memory; and
one or more processors to:
- detect a first trigger indicating that a vehicle is moving at more than a threshold velocity for more than a first threshold time period;
- determine, at a first time and based on detecting the first trigger, a first list of assets that includes information identifying a plurality of first assets proximate to the vehicle using short-range wireless communications, associated with a short-range wireless technology, between the plurality of first assets and the device;
- verify that the first list of assets is correct;
- receive location information identifying a location of a premises of a customer;
- determine, at a second time after the first time, that the vehicle has stopped at the premises of the customer based on the vehicle being stopped for more than a second threshold time period at the location;
- detect, after determining that the vehicle has stopped at the premises of the customer, a second trigger indicating that the vehicle is moving at more than the threshold velocity for more than the first threshold time period;
- determine, at a third time after the second time and based on detecting the second trigger indicating that the vehicle is moving at more than the threshold velocity for more than the first threshold time period, a second list of assets that includes information identifying one or more second assets proximate to the vehicle using the short-range wireless communications between the one or more second assets and the device;
- compare, at the third time or at a fourth time after the third time, information identifying the first list of assets at the first time and information identifying the second list of assets at the third time;
- determine that at least one particular asset included in the first list of assets is missing from the second list of assets based on comparing the information identifying the first list of assets at the first time and the information identifying the second list of assets at the third time; and
- generate
  - a notification indicating that the at least one particular asset has been erroneously left at the premises of the customer when the at least one particular asset is not included in a third list of assets to deliver to the customer.

9. The device of claim 8, where the one or more processors are further to:
- provide the first list of assets to a server device that provides inventory control of assets;
- receive, from the server device, information verifying that the first list of assets is correct; and
- verify that the first list of assets is correct based on the information verifying that the first list of assets is correct.

10. The device of claim 8, where the one or more processors are further to:
- establish the short-range wireless communications between the device and the plurality of first assets provided in the first list of assets; and
- where the one or more processors, when determining, at the first time, the first list of assets, are to:
  - determine, at the first time, the first list of assets based on establishing the short-range wireless communications between the device and the plurality of first assets provided in the first list of assets.

11. The device of claim 8, where the one or more processors are further to:
- establish the short-range wireless communications between the device and the one or more second assets provided in the second list of assets; and
- where the one or more processors, when determining, at the third time after the second time, the second list of assets, are to:
  - determine, at the third time after the second time, the second list of assets based on establishing the short-range wireless communications between the device and the one or more second assets provided in the second list of assets.

12. The device of claim 8, where one or more components of the device or the vehicle determines that the vehicle is moving or has stopped moving.

13. The device of claim 8, where the short-range wireless technology includes one of:
- an infrared technology,
- a near field communication (NFC) technology, or
- a radio-frequency identification (RFID) technology.

14. The device of claim 8, where the one or more processors are further to:
receive, from a server device, the third list of assets.

15. A non-transitory computer-readable medium for storing instructions, the instructions comprising:
one or more instructions that, when executed by one or more processors of a device, cause the one or more processors to:
- identify, at a first time and based on determining that a vehicle is moving at more than a threshold velocity for more than a first threshold time period, a plurality of first assets proximate to the vehicle using short-range wireless communications, associated with a short-range wireless technology, between the plurality of first assets and the device;
- generate a first list of assets based on information identifying the plurality of first assets at the first time;
- receive location information identifying a location of a premises of a customer;
- determine, at a second time, that the vehicle has stopped at the premises of the customer based on the vehicle being stopped for more than a second threshold time period at the location;
- detect, after determining that the vehicle has stopped at the premises of the customer, a trigger indicating that the vehicle is moving at more than the threshold velocity for more than the first threshold time period;
- identify, at a third time after the second time and based on detecting the trigger indicating that the vehicle is moving at more than the threshold velocity for more than the first threshold time period, one or more second assets proximate to the vehicle using the short-range wireless communications between the one or more second assets and the device;
- compare, at the third time or at a fourth time after the third time, information identifying the one or more second assets at the third time and the first list of assets to generate a modified list of assets;
- store the modified list of assets;

determine that at least one particular asset, of the plurality of first assets, is not included in the one or more second assets based on comparing the information identifying the one or more second assets at the third time and the first list of assets;

receive, from a server device, a second list of assets to be on the vehicle at the third time; and generate, based on determining that the at least one particular asset is not included in the one or more second assets and based on the at least one particular asset being included in the second list of assets, a notification indicating that the at least one particular asset has been erroneously left at the premises of the customer.

16. The non-transitory computer-readable medium of claim 15, where one or more components of the device or the vehicle determines that the vehicle is moving or has stopped moving.

17. The non-transitory computer-readable medium of claim 16, where the one or more components include one or more of:
an accelerometer component, or
a global position system (GPS) component.

18. The non-transitory computer-readable medium of claim 15, where the one or more instructions, when executed by the one or more processors, further cause the one or more processors to:
provide the first list of assets to the server device, the server device providing inventory control of assets;
receive, from the server device, information verifying that the first list of assets is correct; and
verify that the first list of assets is correct based on the information verifying that the first list of assets is correct.

19. The non-transitory computer-readable medium of claim 15, where the one or more instructions, when executed by the one or more processors, further cause the one or more processors to:
cause the notification to be displayed on a display of the device.

20. The non-transitory computer-readable medium of claim 15, where the short-range wireless technology includes one of:
an infrared technology,
a near field communication (NFC) technology, or
a radio-frequency identification (RFID) technology.

* * * * *